United States Patent [19]

Favre

[11] Patent Number: 5,472,719
[45] Date of Patent: Dec. 5, 1995

[54] APPARATUS FOR THE PREPARATION OF AN EDIBLE LIQUID

[75] Inventor: Eric Favre, Saint Barthelemy, Switzerland

[73] Assignee: Coffea S.A., Pully, Switzerland

[21] Appl. No.: 863,286

[22] PCT Filed: Oct. 30, 1991

[86] PCT No.: PCT/CH91/00222

§ 371 Date: Jun. 24, 1992

§ 102(e) Date: Jun. 24, 1992

[87] PCT Pub. No.: WO92/07775

PCT Pub. Date: May 14, 1992

[30]   Foreign Application Priority Data

Oct. 31, 1990 [CH] Switzerland ............................ 3459/90
Apr. 10, 1991 [CH] Switzerland ............................ 1058/91

[51] Int. Cl.⁶ .................................................... A23F 5/26
[52] U.S. Cl. ............................... 426/77; 99/295; 426/112; 426/433
[58] Field of Search ...................... 426/77–79, 82, 426/84, 112, 433; 99/295

[56]   References Cited

U.S. PATENT DOCUMENTS

| | | | |
|---|---|---|---|
| 2,715,868 | 8/1955 | Brown | 426/77 |
| 2,778,739 | 1/1957 | Rooth | 426/77 |
| 3,292,527 | 12/1966 | Stasse | 426/77 |
| 3,347,151 | 10/1967 | Ronalds | 426/77 |
| 3,589,272 | 6/1971 | Bouladon | 426/77 |
| 3,607,297 | 9/1971 | Fasano . | |
| 4,136,202 | 1/1979 | Favre | 426/77 |
| 4,167,899 | 9/1979 | McCormick | 426/77 |
| 4,775,048 | 10/1988 | Baecchi et al. | 426/82 |
| 4,853,234 | 8/1989 | Bentley et al. | 426/77 |
| 4,859,337 | 8/1989 | Woltermann | 426/79 |
| 5,104,666 | 4/1992 | Sanvitale | 426/112 |
| 5,242,702 | 9/1993 | Fond | 426/77 |

FOREIGN PATENT DOCUMENTS

| | | | |
|---|---|---|---|
| 657233 | 2/1963 | Canada | 426/78 |
| 0199953 | 12/1986 | European Pat. Off. . | |
| 0211511 | 2/1987 | European Pat. Off. . | |
| 2211924 | 7/1974 | France | 426/77 |
| 2373999 | 7/1978 | France . | |
| 2556323 | 6/1985 | France | 426/77 |
| 2617389 | 1/1989 | France | 426/77 |
| 2023086 | 12/1979 | United Kingdom | 426/433 |
| 2121762 | 1/1984 | United Kingdom | 426/77 |

*Primary Examiner*—Steven Weinstein
*Attorney, Agent, or Firm*—Clifford W. Browning; Woodard, Emhardt, Naughton, Moriarty & McNett

[57]   ABSTRACT

When in use, the sealed cartridge (1) containing a certain amount of a substance intended for the preparation of a bewerage by dissolution or extraction with a liquid, is placed inside a liquid collector member comprised of a frusto-conical beaker (9). The assembly thus formed is placed inside a housing (21) of a "spoon" of a coffee machine. The top of the cartridge (1) is perforated by a perforator and injector member which injects a liquid under pressure inside the cartridge (1). The lower membrane (2) of the cartridge undergoes a deformation under the effect of the pressure thus generated and is pressed against perforator tips (13) at the bottom of the beaker (9). The liquid flows into the housing (21) and can be collected in cups. The invention makes it possible to optimize the contact time of the substance contained inside the cartridge with the liquid supplied for its dissolution or its extraction.

12 Claims, 4 Drawing Sheets

APPARATUS FOR THE PREPARATION OF AN EDIBLE LIQUID

The invention is concerned with a method for preparing a liquid product and also with a device for carrying out such a method. More specifically, the invention is aimed at a method for preparing a liquid product, in which a liquid and/or steam are introduced under pressure into a cartridge containing a certain amount of at least one substance capable of forming said product by the effect of said liquid and/or steam and this product is collected outside the cartridge, as well as at a device comprising an apparatus and a cartridge for preparing a liquid product by the introduction under pressure, of a liquid and/or of steam into a cartridge containing a certain amount of at least one substance capable of forming said product by the effect of said liquid and/or of steam, this apparatus comprising means for supplying liquid and/or steam to the cartridge, as well as means for collecting the liquid product outside the cartridge. The invention is aimed more particularly at a cartridge containing a certain amount of at least one substance for the preparation of a liquid product by the effect of a liquid and/or of steam introduced under pressure into the cartridge, this cartridge comprising a watertight casing including a side wall and further two walls, one of which provides the bottom of the cartridge and the other closes the opposite end of the cartridge.

The invention relates in particular to a cartridge such as indicated above, this cartridge being intended for use in preparing a hot or a cold drink, such as coffee or chocolate, or a liquid food such as soup, by means of an apparatus of a conventional type such as a coffee machine, which comprises a device for injecting a liquid such as hot water or hot milk or again steam under pressure into a certain mass of a powdered substance, specially of ground coffee beans, in order to extract the soluble substances contained in the powdered substance.

Cartridges of this type are already known, which in particular offer the advantage that the original substance can be protected from ambient air or optionally kept under vacuum, in order to retain its freshness for a prolonged period of time.

The invention aims in particular at providing a cartridge of the above-described type, constructed so that it can be mass-produced at low cost, while ensuring a perfect conservation of the substance contained therein and optimal conditions for the preparation of the liquid product, specially with respect to the contact time of the powdered substance with the liquid supplied from the above-mentioned conventional type apparatus.

To this end, the cartridge according to the invention is characterized in that at least one part of the cartridge bottom is designed so that it can undergo a deformation of a predetermined magnitude without breaking, while moving away from the cartridge end opposite its bottom, under the effect of the introduction of said liquid and/or steam inside the cartridge.

The invention also relates to a collector member of liquid product for the above-mentioned cartridge. This collector member is characterized in that it comprises at least one inner space defined between an opening for the introduction of the cartridge and a wall having at least one aperture therethrough for the outflow of the liquid product, and in that it is provided with means for perforating the bottom of the cartridge when the latter has reached a certain degree of deformation from its original shape, thereby allowing the liquid product to flow out through said aperture.

Finally, the invention relates to a perforator and liquid injector member for the above-mentioned cartridge, this member forming an integral part of an apparatus or of a device for supplying a liquid, or being designed so that it can be fitted on the part of such an apparatus or device supplying the liquid, and this member being characterized in that it is provided with a wall formed to abut against the upper wall of the cartridge and with means for forming at least one aperture in the latter as said walls are applied one against the other, to connect the inside of the cartridge with at least one injection conduit for the liquid supplied from said apparatus or device.

According to one embodiment of the invention which is particularly advantageous, the bottom of the cartridge has a concave vaulted shape.

Further, it can be advantageous to shape the upper part of the cartridge as a dome.

In particular, it can be desirable to make the bottom and the upper part of the cartridge of a complementary shape, to make possible the nesting of a plurality of cartridges one on top of the other.

In accordance with one specific embodiment, the bottom of the cartridge and/or the wall closing the upper part of the cartridge have at least one weakened portion.

It may be advantageous to provide the cartridge with an inner wall pervious to liquids, but capable of retaining a powdered substance contained in the cartridge.

In accordance with another embodiment of the cartridge, the latter is provided with an upper wall designed to make possible the removal of at least a portion of this wall before using the cartridge.

The cartridge includes advantageously a porous membrane designed for retaining the substance contained within the cartridge after removal of at least a portion of the upper wall of the cartridge.

Further, it may also be advantageous that the cartridge be provided with an inner filter membrane placed at the bottom of the cartridge, preferably immediately above the bottom wall thereof and optionally resting at least on a portion of this wall and being bonded thereto, and/or to the inner surface of the side wall of the cartridge.

In accordance with one specific embodiment of the collector member, the wall closing the housing for receiving the cartridge is provided with at least one discharge opening in liquid communication with at least one conduit extending in the inward direction of said housing through a projection ending with a sharp tip or with a cutting edge.

In said embodiment, the cutting edge when viewed from above is advantageously of a generally curved shape, and preferably C-shaped as shaped as a horseshoe.

In accordance with one specific embodiment of the perforator and injector member of the invention, said means for making said opening in the upper wall of the cartridge include at least one projection ending with at least one sharp tip or cutting edge, said projection(s) protruding from the wall of the perforator and injector member being designed for pressing against the upper wall of the cartridge, and being associated with at least one conduit for injecting liquid extending through the perforator and injector member, so as to make possible the injection inside the cartridge of the liquid supplied from said supply apparatus or device.

In this embodiment, said projection is advantageously ended by a sharp tip and it is provided with a conduit for injecting liquid in communication with a plurality of nozzles for projecting the liquid, directed in such a manner as to produce a series of streams of liquid impinging at several differing angles against the inner surface of the upper wall of the cartridge, after the penetration of said projection inside the cartridge.

The process according to the invention is characterized in that a cartridge—which comprises a watertight casing including a side wall and two further walls one of which provides the bottom of the cartridge and the other closes the opposite end of the cartridge, at least one portion of the bottom of the cartridge being constructed so that it can undergo without breaking a deformation in the direction away from the end of the cartridge opposite its bottom under the effect of the introduction of said liquid and/or steam—is placed inside an inner space of a collector member, the inner space being defined between an opening for the introduction of the cartridge and a wall through which extends at least one aperture for the outflow of the liquid product and which is provided with means for perforating the bottom of the cartridge after the latter has undergone certain degree of deformation from its original shape, and a predetermined amount of said liquid and/or steam is then introduced into the cartridge to produce said deformation of the bottom of the cartridge and its perforation by said perforator means, thus making possible the outflow of liquid product through said opening(s).

The assembly formed by the apparatus and the cartridge according to the invention is characterized in that the cartridge comprises an impervious casing including a side wall and two further walls, one of which provides the bottom of the cartridge and the other closes the opposite end of the cartridge, at least one portion of the bottom of the cartridge being constructed so that it can undergo without breaking a deformation of a predetermined magnitude in the direction away from the end of the cartridge opposite its bottom under the effect of the introduction of said liquid and/or steam, and in that said means for collecting the liquid product include at least one collector member comprised of at least one inner space defined between an opening for introducing the cartridge and a wall through which extends at least one aperture for the outflow of the liquid product and which is provided with means for perforating the bottom of the cartridge, after the latter has undergone a certain degree of deformation from its original shape.

BRIEF DESCRIPTION OF THE DRAWING FIGURES

A detailed description will now be made of several particular embodiments of the cartridge according to the invention as non-limiting examples thereof, as well as of a collector member for receiving the liquid product from said cartridge and of a perforator and liquid injector member for said cartridge, with reference to the appended drawing, in which:

FIG. 9 is a cross-sectional view of the bottom of a cartridge according to the invention after said cartridge has been used with the collector member of FIGS. 8 and 8a;

Figure 12A:
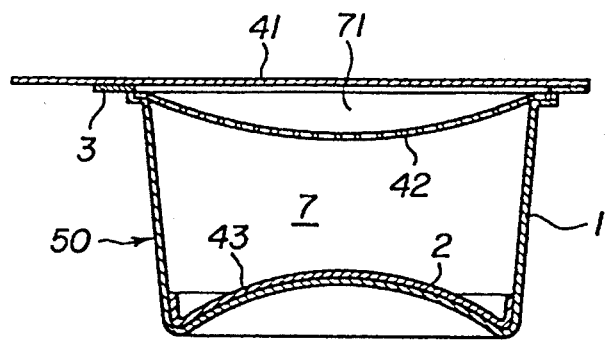
Figure 12B:
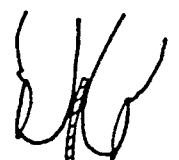
Figure 12B:
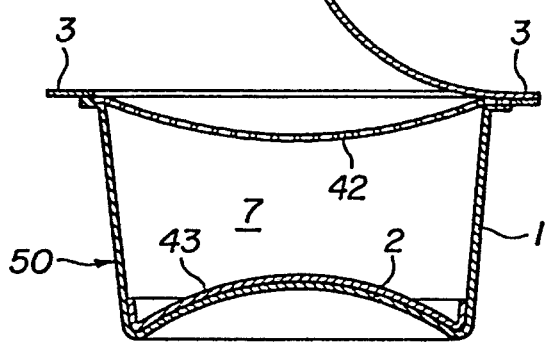
Figure 13:
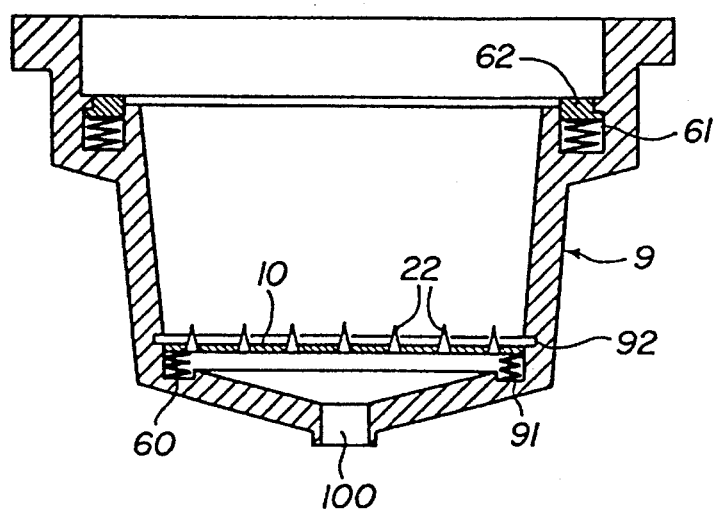
Figure 14:
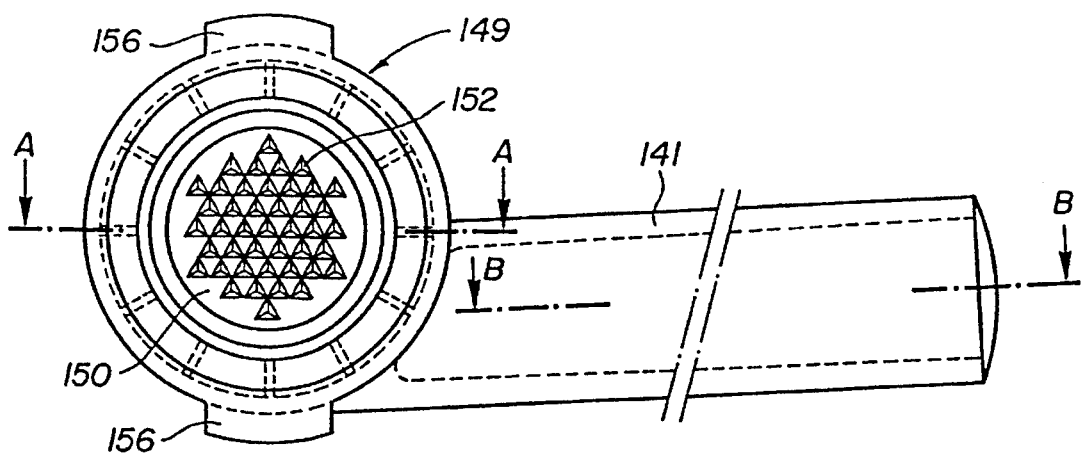
Figure 15:
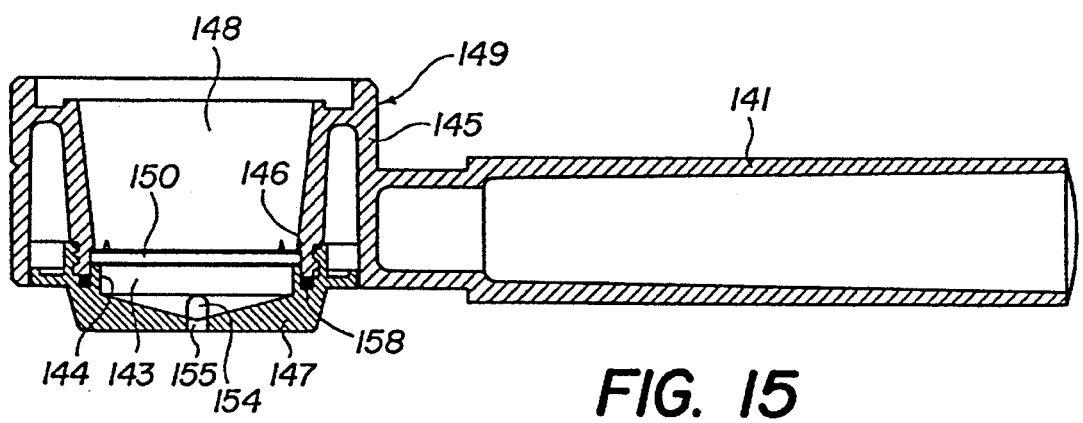
Figure 16:
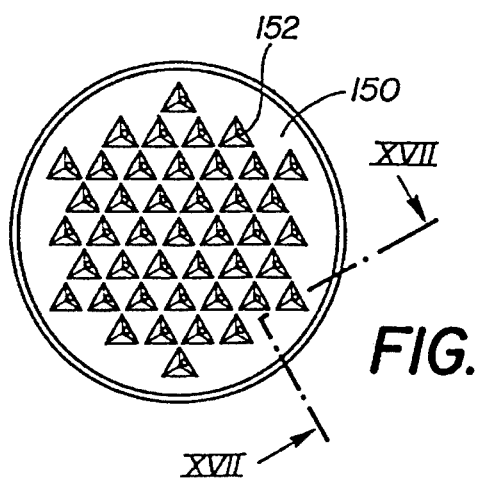
Figure 17:
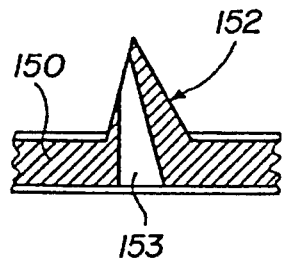

FIGS. 12(a) and 12(b) are cross-sectional views taken axially of another embodiment of the cartridge;

FIG. 13 is a cross-sectional view taken axially of another embodiment of the collector member of liquid product;

FIG. 14 is a schematic top view corresponding to yet another embodiment of the collector member of liquid product;

FIG. 15 is a schematic cross-sectional view of the collector member shown in FIG. 14, taken vertically along lines A—A and B—B thereof;

FIG. 16 is a top view of a filter wall, provided with perforator means and designed for mounting inside the collector member shown in FIGS. 14 and 15; and FIG. 17 is a cross-sectional view at an enlarged scale of a portion of the filter wall shown in FIG. 16, taken vertically along line XVII—XVII thereof.

Figure 2:
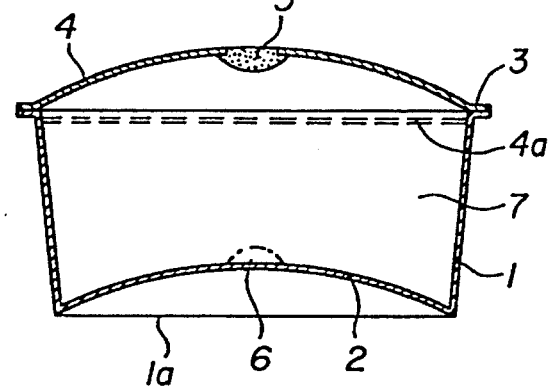
FIG. 2 is a cross-sectional view taken axially of an embodiment of the cartridge.

The cartridge shown in FIG. 2 is comprised of an impervious casing including a side wall 1 closed along its basis by a wall 2 integral with the casing. Advantageously, this casing is made from a sheet of aluminium having a thickness of 30 to 110 micrometers, a thickness of 50 micrometers being particularly preferred. The general shape of the cartridge is truncated with a conicity measured relatively to the axis of the cartridge ranging from 1° to 10° and preferably being in the order of 3°, an angle particularly well suited for facilitating the introduction and the retrieval of the cartridge from inside the collector member of liquid product.

The outer casing of the cartridge can also be advantageously made of a plastic material. In particular, the outer casing of the cartridge can be shaped as beakers by thermoforming, using a sheet of synthetic resin.

The lower wall 2 of the cartridge has preferably a concave vaulted shape, its central part being at a distance in the order of 1 to 20 mm from the geometrical base of the cartridge, and preferably at a distance of 8 to 10 mm. This vault may have any appropriate shape such as e.g. a rounded or a truncated shape.

The wall 2 forming the bottom of the cartridge may also be flat over its entire surface and extend in a plane running parallel to the plane of the lower circular edge 1a of the side wall 1 of the cartridge, the former plane being offset relative to the latter within the volume occupied by the cartridge, and the distance between these two planes being also in the order of 1 to 20 mm, and preferably of 8 to 10 mm.

The upper wall 4 of the cartridge as shown in FIG. 2 is bonded along its periphery to the side wall 1 of the cartridge along a rim 3. The joining of the upper wall 4 to the side wall 1 of the cartridge can be achieved by any appropriate means, in particular by heat sealing or by crimping. The upper wall 4 has advantageously a convex shape extending above the plane of the rim 3 by a distance of 1 to 20 mm, and preferably 7 mm. However, the wall 4 may also be flat or have a frusto-conical shape. In an alternative embodiment shown in FIG. 2, the membrane 4 can be constructed to be peeled off along the rim 3 and the cartridge includes a porous membrane 4a bonded to the brim 3, this membrane being provided for retaining the substance filling the cartridge when the upper wall 4 of the cartridge is removed. The central part of the upper wall 4 of the cartridge is preferably provided with a small housing 5 which has for example a generally cylindrical shape. Advantageously, the bottom of the housing 5 is weakened. Further, the lower wall 2 can also have in its upper part a small housing 6 for example of a generally cylindrical shape. In accordance with a preferred embodiment, the bottom of this housing 6 is also weakened.

In accordance with another embodiment of the cartridge (not illustrated), the upper wall 4 of the cartridge is flat, but comprises a plurality of elongated weakened sections, each consisting of a groove the bottom of which is less thick than the remainder of the wall, such that the wall 4 is ruptured along these sections when a uniform pressure is applied on the wall 4 as hot water or steam is supplied under pressure from a coffee machine. Advantageously, these elongated weakened sections can extend radially from the center of the wall 4.

The inside 7 of the cartridge is filled with one or several powdered substances, or with at least one liquid or a slurried substance, or further with a mixture of at least one powdered substance and of at least one liquid substance or slurried substance. For example, the powdered substance can be ground roasted coffee, roasted tea leaves or other tea leaves, or a chocolate containing product. The powdered substance can also contain the ingredients for a soup or for a liquid or soluble sauce.

Figure 3:
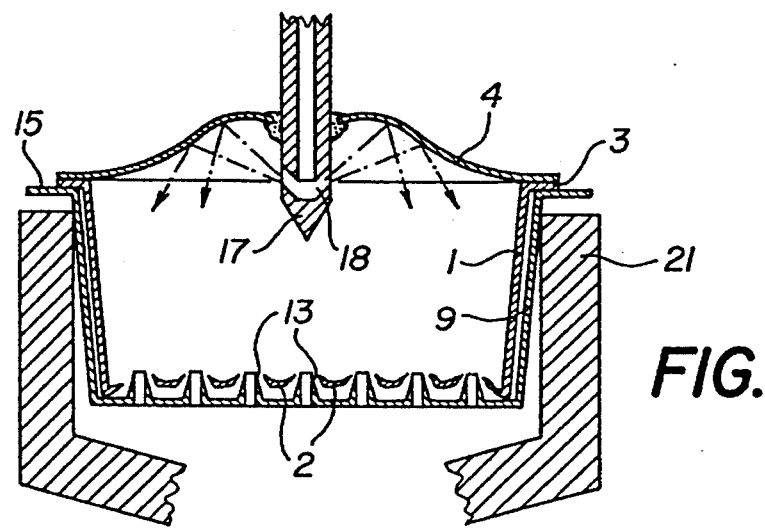
FIG. 3 shows the cartridge of FIG. 2 placed inside the collector member for the liquid product, capped with the perforator and liquid injector member as the cartridge is being used.
Figure 4:
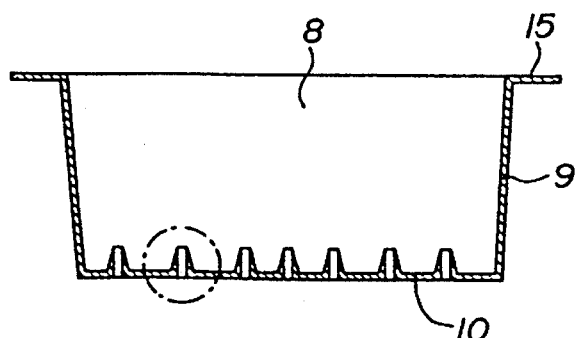
FIG. 4 shows one particular embodiment of the collector member of liquid product.
Figure 5:
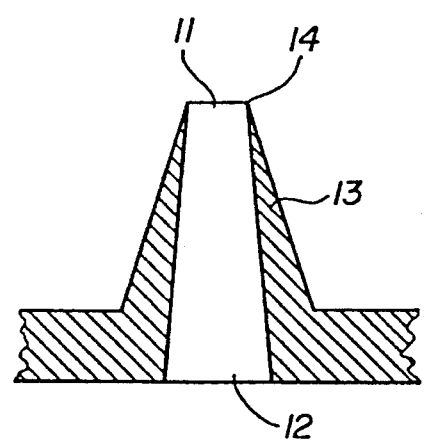
FIG. 5 is a view to an enlarged scale of the portion of the collector member of liquid product indicated by a circle in FIG. 4.

As shown in FIG. 3, the cartridge when used is placed inside a collector member of liquid product which constitutes the extraction device of an apparatus for preparing beverages of the conventional type, such as an expresso coffee machine. The collector member of liquid shown in FIG. 4 is comprised of a frusto-conical beaker 9 with a conicity corresponding to an angle of 1 to 10°, and preferably of 3°, which is closed at its lower end by a wall 10. Wall 10 is provided with openings having advantageously a surface area amounting to 2 to 20% of the overall surface of the wall 10. These openings, of which one is shown in FIG. 5 at an enlarged scale can advantageously have an inlet diameter of 400 micrometers and an outlet diameter of 500 micrometers. According to one preferred embodiment, the opening is provided with a frusto-conical projection 13 extending from the surface of the inner wall of the collector member to a height in the order of 500 micrometers to 5 mm, and preferably 1 mm. The upper edge 14 of the opening 13 is sharp so that it can puncture or tear open the lower wall 2 of the cartridge. The collector member for the liquid is advantageously provided in its upper section with a rim 15 matching the lower peripheral section 16 of the perforator and liquid injector member shown in FIG. 1. A sealing member made for example of rubber (not illustrated) can be used between the rim 15 and the perforator and liquid injector member when the liquid collector member and the perforator and liquid injector member are mounted in the apparatus used for the preparation of the liquid product.

Figure 1:
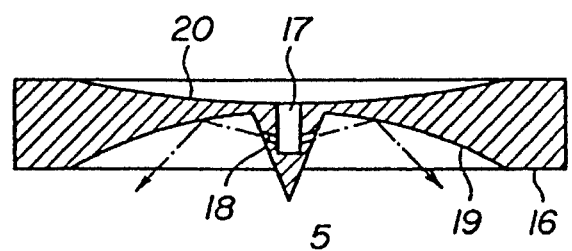
FIG. 1 is a cross-sectional view taken axially of one embodiment of the perforator and liquid injector member.

As can be seen in FIG. 1, the perforator and liquid injector member is provided with a centrally positioned sharp tip 17 having a conduit for supplying liquid, in communication with a plurality of nozzles 18 for projecting the liquid, the axes of which are advantageously set at an obtuse angle relative to the axis of the sharp tip 17. The number of nozzles for projecting the liquid is not limited, but is preferably of at least 3 and their diameter can range for example from 100 micrometres to 900 micrometers, the preferred value being 500 micrometers.

The lower part of the perforator and liquid injector member is vaulted at 19 and is preferably shaped so as to match the convex shape of the upper wall 4 of the cartridge. The perforator and liquid injector member shown in FIG. 1 is designed for mounting by any appropriate means such as screws on the liquid injector device forming part of the apparatus in which the cartridge is used, such a for example a conventional expresso coffee machine.

When in use as shown in FIG. 3, the cartridge is placed inside the inner space 8 of the liquid collector member 9, which in turn is nested inside a housing 21 forming part of a mounting member, such as for example the "handle" or the "spoon" attached to the hot water or steam producing apparatus by any appropriate means, such as a bayonet type connector.

When the mounting member supporting the liquid collector member 9 containing the cartridge is placed in the machine used for the preparation, the top of the cartridge is perforated by the perforator and liquid injector member and the liquid is injected under pressure through the openings 18 inside the cartridge in streams impinging upon the surface of the inner wall of the upper part 4 of the cartridge, thus ensuring an even distribution of liquid over the upper surface of the powdered substance placed inside the cartridge. This injection of the liquid is advantageously conducted under a relatively high pressure, which can reach or even exceed 15 bars.

The effect of the high pressure is firstly to deform the lower membrane 2 of the cartridge and after a period of time which varies depending on the resistance of this membrane and the flow of liquid, to press this membrane against the sharp tips 13 at the bottom of the liquid product collector member 9, with the result that the sharp tips 13 perforate the member 2 of the cartridge or tear it open to allow a smooth outflow of liquid product through the openings provided in each one of the sharp tips. Thus, the liquid product flows directly into the housing 21 of the mounting member which constitutes a small liquid collector chamber (not illustrated) to direct the liquid product into a container, such as a cup or a beaker.

When the liquid product is ready and has entirely flowed away, the mounting member with the collector housing 21 are released from the machine used for preparing the liquid product—for example an expresso coffee machine—together with the liquid product collector member 9 and the cartridge. Then, a sharp reversal movement will release the cartridge and its contents from the collector member 9. In one embodiment which is particularly advantageous, the lower wall 2 of the cartridge is made of a material sufficiently flexible for ensuring the cleaning of the sharp tips 13 and for preventing that particles of the powdered product from inside the cartridge remain adhering to them.

Figure 6:
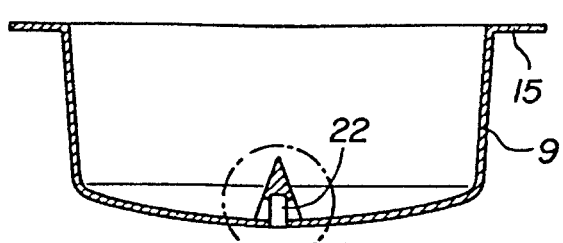
FIG. 6 shows another embodiment of the collector member of liquid product.

In the case of the substance contained inside the cartridge being a liquid or being soluble, such as for example a soluble substance for preparing a soup or instant coffee, or further a liquid or a soluble sauce, a liquid product collector member 9 is used which is preferably shaped as in the embodiment shown in FIG. 6. In this embodiment, the lower wall of the liquid product collector member is provided with a single centrally located sharp tip 22 constructed as shown in FIG. 7.

Figure 7:
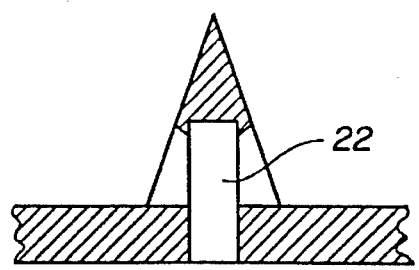
FIG. 7 is a view to an enlarged scale of the portion of the collector member according to FIG. 6, indicated by a circle in this figure.

As can be seen in FIG. 7, the centrally located sharp tip 22 protrudes from the bottom of the collector member, the lower wall of which is shaped as a curved collector chamber about 2 to 15 mm deep, and preferably 6 mm deep. As can be seen in FIG. 7, the sharp tip 22 is provided with an opening extending from its base for the outflow of the liquid product.

Figure 8:
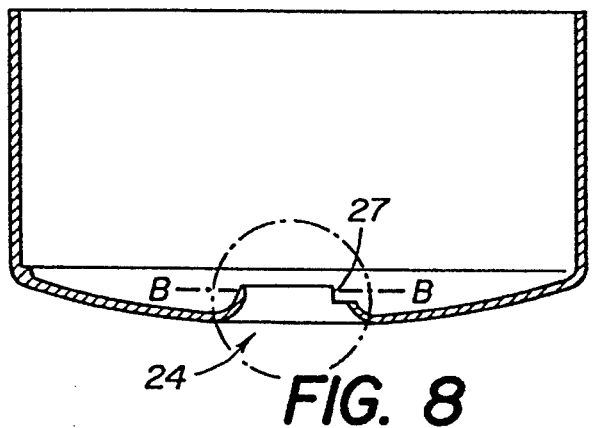
FIG. 8 shows another embodiment of the collector member of liquid product.
Figure 8A:
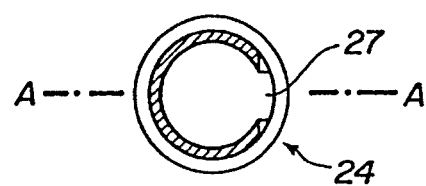
FIG. 8a is a cross-sectional view taken along line B—B of the portion of the collector member indicated by a circle in FIG. 8.
Figure 9:
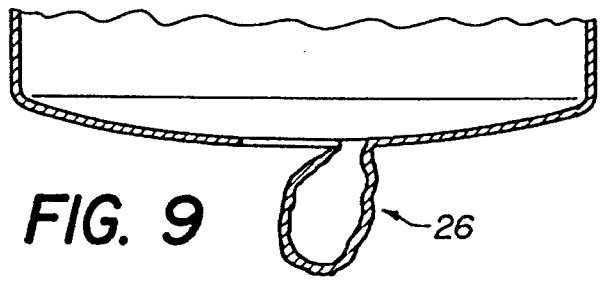

The embodiment of the liquid product collector member shown in FIG. 8 is similar to that of FIGS. 6 and 7, except that instead of a centrally located sharp tip 22, a projection of a curved shape with an upper cutting edge 27 and a central opening 24 extending through the bottom wall of the collector member are provided. This projection is advantageously 0.5 to 3 mm high and more particularly in the order of 1 mm high, for cutting open the lower membrane 26 of the cartridge with its upper cutting edge. This edge when viewed from above can be shaped as a circle, but is preferably C-shaped as illustrated in FIG. 8a or has the shape of a horseshoe. Accordingly, when the cartridge is used, the wall 26 of the lower membrane is not released completely from the remaining of the membrane, but remains attached thereto as illustrated in FIG. 9. Hence, there is no risk of a portion of the membrane being carried away by the flow of the liquid product.

Figure 10:
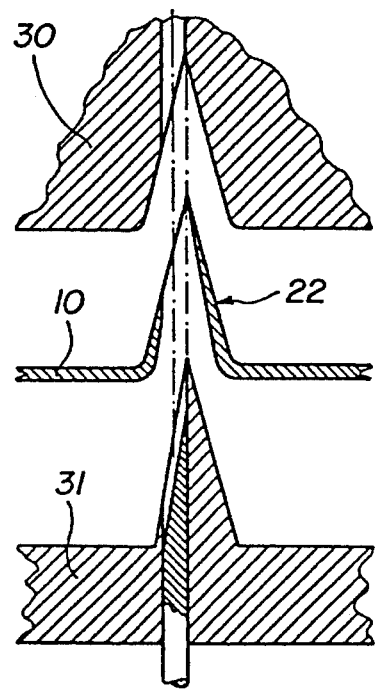
FIG. 10 is a cross-sectional view, similar to that of FIGS. 5 and 7, showing another embodiment of the perforator tip which is formed as part of the collector member of liquid product.

The perforator tip 22 shown in FIG. 10 is provided with a through conduit 23 for the outflow of the liquid product. The axis of the conduit 23 is offset with respect to the axis of the sharp tip 22. This reduces the risk that the conduit 23 may become clogged by one or several solid particles such as a particle of the substance to be extracted or dissolved, or further by a fragment of the container material, carried by the flow of liquid product. The conduit 23 has two successive concentric borings of different diameter, which facilitates the washing away of particles which may have entered the narrower section and the cleaning of the conduit, for example with a stream of hot water. Conduit 23 could have for the same purpose a conical longitudinal cross-section as in the embodiment of the sharp tip illustrated in FIG. 11.

The perforator tip as shown in FIG. 10 can be made for example by boring the conduit 23 with its axis offset with respect to that of the tip 22 or by truncating through milling—for example at an angle of 30°—a tip 22 having originally a centrally extending conduit 23.

Figure 11:
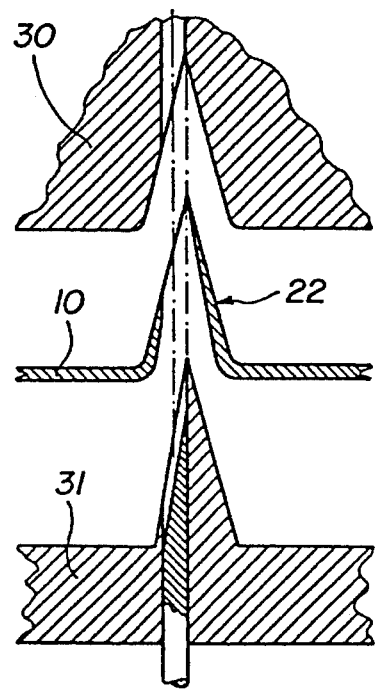
FIG. 11 is a schematic cross-sectional view illustrating another manner in which the tip can be constructed, to provide an alternative embodiment to that shown in FIG. 10.

The perforator tip 22 shown in FIG. 11 is formed by the stamping of a plate, for example of stainless steel, to form the filter wall 10 of the beaker 9 of the liquid collector member (e. g. as shown in FIG. 4). This stamping is carried out using a female die 30 and a male die 31, both dies being preferably constructed so as to produce simultaneously all of the tips 22 of the filter wall 10 as a plurality of identical tips as shown for example in FIG. 3 and 4.

The cartridge 50 shown in FIGS. 12(a) and 12(b) is similar to that illustrated in FIG. 2, except that its upper part is closed by a flat obturating membrane 41, which is as impervious as the side wall 1 and the bottom 2 of the cartridge 50.

An inner membrane 42, perforated with a plurality of small openings (which can optionally be partly blocked) allowing the passage of water or of steam, but retaining the solid particles of the substance to be extracted or dissolved contained in the compartment 7 of the cartridge 50, is bonded for example by heat sealing of its peripheral portion to the upper part of the cartridge 50, beneath the obturating membrane 41.

As shown in FIGS. 12(a) and 12(b), the inner membrane 42 has advantageously a shape which is slightly concave and which can be made for example by thermoforming a sheet which was originally flat.

Thus, in the original state of the cartridge illustrated in FIG. 12(a), a compartment 71 is formed between the obturating membrane 41 and the inner membrane 42. This compartment 71 can advantageously be used for containing a substance to be extracted or dissolved, and which is different from that contained in the main inner compartment 7 of the cartridge 50. The two substances thus remain separated from each other and their extraction or dissolution products mix only when the cartridge is used.

Advantageously, the cartridge can comprise an inner filter membrane 43 which is placed at the bottom of the cartridge, for example overlying the inner wall 2 as shown in FIGS. 12(a) and 12(b), while being bonded, for example by heat bonding, to the inner surface of the side wall 1 or of the lower wall 2 of the cartridge.

This filter membrane 43 functions to retain the particles of solid substance contained inside the cartridge and to prevent the clogging of the outflow openings inside the perforator tips 13 or 22 by particles of this substance sufficiently small to penetrate into the opening but two large to flow freely therethrough with the liquid. The filter membrane 43 is preferably sufficiently flexible and resilient to avoid being itself punctured by the tips 13 or 22. Thus, owing to the filter membrane 43, any direct contact between the solid particles contained in the cartridge and the perforator tips 13 or 22 is avoided. The filter membrane 43, as well as the inner membrane 42 placed above the substance contained in the cartridge, are made advantageously by assembling in a nonwoven sheet, fibers such as a mixture of synthetic polymeric fibres and cellulose fibers.

As can be seen in FIG. 12(b), the obturating membrane 41 can be peeled off by the user of the cartridge 50 immediately before the introduction thereof inside the collector member of liquid product.

The liquid product collector beaker 9, which forms the liquid product collector member shown in FIG. 13 has a filter wall 10 with a plurality of perforated perforator tips 22, with the filter wall 10 resting on a support 60 held in a peripheral groove 91 formed in the bottom of the inner part of the liquid product collector beaker 9. The filter wall 10 is maintained removably in its position by means of an O-ring (not illustrated) positioned inside a peripheral groove 92 at the bottom of the collector beaker 9.

Accordingly, the filter wall 10 is easy to remove for its cleaning. Further, the vertical displacement of the filter membrane 10 under the effect of the resilient force exerted by the support 60 makes it easier to remove the used cartridges.

The beaker 9 shown in FIG. 13 is further provided along its upper periphery with an elastic ring 61 and an O-ring 62, the function of this elastic ring 61 being to press the rim 3 of the cartridge against the water or steam supply member (the so-called "shower head") of the machine which is used, for example of a coffee machine of the "espresso" type. Accordingly, a good seal can be achieved between this "head" and the cartridge and the vertical positional variations of the "shower heads" occurring with machines from different manufactures can be compensated.

It should be noted that one can use, instead of the filter membrane 10, an annular knife fitted inside the lower opening 100 of the cartridge support 9.

Each one of the perforator tips 22 has advantageously the shape of a pyramid, for example with a triangular basis. Good results concerning the ease and reproducibility of the perforation of the lower wall 2 of the cartridge were obtained with pyramidal tips 22 having an angle of about 30°.

The collector beaker 9 as well as the wall 10 and the perforator tips 22 can advantageously be made of a plastic material both hard and heat resistant, such as a polysulfone resin. The perforator tips 22 can comprise one or several conduits for the outflow of the liquid product, and the conduit(s) open(s), in the case where the perforator tips 22 are pyramidal, in the vicinity of the upper part of at least one of the side faces.

The liquid product collector member 149 shown in FIGS. 14 and 15 is made as a handle to be fitted, for example by means of a bayonet type connector, to a hot water or steam supplying apparatus of the type used on the conventional "espresso" coffee machines.

This collector member 149 comprises a housing 148 designed for receiving a cartridge according to the invention (not illustrated), a handle 141 formed by molding with a hollow body 145 the inside of which forms the housing 148, a removable cap 147 screwed to the lower part of the body 145 and a removable filter wall 150 which is fitted inside the collector member 149 by squeezing between a lower rim 146 located on the lower part of the inner wall of the housing 148 and the upper surface of an annular wall 144 defining a liquid collector compartment 143 within the cap 147.

The filter wall 150 is provided with a plurality of perforator members 152 of a pyramidal shape with a triangular base, each being perforated with an ourflow conduit for the liquid 153 as can best be seen in FIG. 17.

The watertightness of the connection between the lower part of the body 145 and the cap 147 is achieved by means of an elastic O-ring 158.

The outflow of liquid from the collector compartment 143 is ensured by an elongated channel 154 extending horizontally at the bottom of compartment 143 and by two symmetrically positioned outflow openings 155 (of which only one can be seen in FIG. 15), one at each end of the channel 154.

The watertightness of the connection between the upper part of the body 145 and the outlet of the hot water or steam supply apparatus (not illustrated) is achieved by means of an O-ring (not illustrated) pressing against a circular surface of a diameter corresponding to that of the ring when the collector member 149 is connected to the hot water or steam supply outlet by means of a bayonet type connection in a manner known per se using two diametrically opposed cams 156 protruding from the upper section of the body 145.

The material used for forming the wall of the above-described cartridge can be used in very small amounts and it can be a biodegradable material. Any appropriate material may be used, and its nature depends upon the substance to be protected contained in the cartridge. For example, aluminium and other metallic materials may be used. Sheets of plastic material can equally be used, and in particular, those plastic materials exhibiting some elasticity and/or which are readily peformed by heat.

The cartridge according to the invention can be used in any type of known apparatus used for the preparation of conventional beverages, such as the so-called expresso coffee machines, by using a suitable connection device for mounting the perforator and liquid injector member on the outlet of such an apparatus generating the liquid or the steam for the preparation of the liquid product.

The cartridge according to the invention differs from prior art cartridges, among others in that it enables an optimization of the preparation of the liquid product, in particular because pre-moistening, aeration, dissolution of the soluble matter, and trapping of volatile aroma can be carried out for an optimized period of time before the perforation of the lower wall of the cartridge and the discharge of a liquid product such as a beverage, a soup or a sauce prepared in the cartridge.

Clearly, the dimensions and the shape of the cartridge can be modified as appropriate to make possible its use with any known apparatus, and in particular with the coffee machine of the "Italian mocca" type.

I claim:

1. An apparatus for the preparation of an edible liquid product by the introduction under pressure of a liquid and/or steam into at least one substance capable of forming said liquid product by the effect of said liquid and/or steam upon the substance, comprising a cartridge containing said substance and means for supplying the interior of said cartridge with liquid and/or steam under pressure and means for collecting the liquid product outside the cartridge, wherein said cartridge includes an impervious casing including a side wall and two opposite walls, forming, respectively, the bottom and the top of the cartridge, at least one portion of the bottom of the cartridge being deformable without breaking to a predetermined degree in the direction away from the top of the cartridge under the effect of the introduction of said liquid and/or steam under pressure into said cartridge and wherein said means for collecting the liquid product includes at least one collector member comprising a housing defining an opening for receiving said cartridge and a bottom part, positioned below said deformable portion of said cartridge, and comprising a filter plate having a plurality of protuberances disposed toward the opening for receiving said cartridge, said protuberances having flow through channels therein, said protuberances being spaced from the bottom of the cartridge when said cartridge is received within said collector member, but are dimensioned such that when said cartridge is inserted in said collector member and liquid and/or steam is introduced under pressure into said cartridge, said deformable portion of said cartridge will deform under said pressure to said predetermined degree without rupturing such that during said time said liquid product is prepared under optimal conditions, and then said deformable portion will be deformed further and against the protuberances and the protuberances will perforate said deformable portion thus allowing said liquid product to flow out of said cartridge and down through said protuberances.

2. A cartridge as claimed in claim 1, wherein said bottom of the cartridge has a concave vaulted shape.

3. A cartridge as claimed in claim 1 comprising an inner wall part impervious to liquids, but capable of retaining said substance, said substance being a powdered substance contained in the cartridge.

4. A cartridge as claimed in claim 1 provided with an upper wall portion arranged for permitting removal thereof before using the cartridge.

5. A cartridge as claimed in claim 4 comprising a porous membrane arranged for retaining said substance contained in the cartridge after removal of said upper wall portion of the cartridge.

6. A cartridge as claimed in claim 1 comprising an inner filter membrane placed at the bottom of the cartridge.

7. An apparatus as claimed in claim 1, wherein said protuberances have the shape of truncated cones.

8. An apparatus as claimed in claim 1, wherein said protuberances have the shape of points.

9. An apparatus as claimed in claim 8, wherein said points each have at least one lateral surface through which extends said flow through channel.

10. An apparatus as claimed in claim 1, wherein said protuberances have a pyramidal shape.

11. An apparatus as claimed in claim 1, wherein said collector member is part of a cartridge support member removably fixed to said means for supplying the cartridge with liquid and/or steam.

12. An apparatus and a cartridge as claimed in claim 1, wherein said cartridge has a peripheral rim, said means for supplying the cartridge with liquid and/or steam comprising a shower-like outlet part, and said collector member has a ring-shaped sealing member surrounding said opening of the collector member, said sealing member being arranged for applying said rim of the cartridge against said outlet part of said liquid and/or steam supplying means.

* * * * *